MULTI-PHASE SIGNAL PROCESSOR FOR LIGHT LINE OPTICAL CORRELATOR

Filed Oct. 17, 1961

6 Sheets-Sheet 1

WALTER KUEHNE
INVENTOR.
BY John G. Graham

WALTER KUEHNE
INVENTOR.
BY John G. Graham

WALTER KUEHNE
INVENTOR.

BY John G. Graham

WALTER KUEHNE
INVENTOR.
BY John G. Graham

WALTER KUEHNE
INVENTOR.
BY John G. Graham

WALTER KUEHNE
INVENTOR.
BY John G. Graham

United States Patent Office 3,184,679
Patented May 18, 1965

3,184,679
MULTI-PHASE SIGNAL PROCESSOR FOR LIGHT LINE OPTICAL CORRELATOR

Walter Kuehne, Dallas, Tex., assignor to Texas Instruments Incorporated, Dallas, Tex., a corporation of Delaware Filed Oct. 17, 1961, Ser. No. 145,718
9 Claims. (Cl. 324—77)

This invention relates to a signal processing system for analyzing complex electrical signals and more particularly to arrangement for processing the output of a light line optical correlator.

A light line optical correlator system may be particularly adapted for analyzing a complex signal such as may be derived from a pulsed Doppler radar. The light line correlator makes use of a line of light which is intensity modulated with the signal to be analyzed and which may be swept normal to the line length in synchronism with the basic period of the signal. The light line is projected through a light chopper to fall on the screen of a camera tube such as a vidicon. The light chopper is a continuously moving belt, disc or drum which includes a plurality of parallel channels of alternate clear and opaque areas, the length and spacing of the opaque areas for each channel corresponding to some signal frequency of interest. With such an arrangement, a variation in light intensity in a particular area of the vidicon screen will occur if the intensity modulation of the light line includes a component of the same frequency as the interruption rate of one of the light chopper channels. This variation will be an increase of light intensity at the vidicon if the signal is in phase with the light chopper channel and a decrease if the signal is out of phase, either case resulting in a recognizable output from the vidicon. However, if the input signal is exactly 90° out of phase with the interruptions of the corresponding channel of the chopper, then no signal would be perceptible at the vidicon since the average of the light reaching the screen would be equal to that of noncorrelating signals.

Accordingly, in order to render the system insensitive to phase, it has been found advantageous to split each channel of the light chopper into two or more channels which provide the same interruption rate but which are of different phase relationships. For example, in the above-mentioned copending application, there is disclosed and claimed an embodiment of a light line optical correlator system wherein each frequency channel of the light chopper is divided into two phase channels which are displaced from one another by 90° of phase angle. However, the output display from such a system would give rise to some ambiguity in interpretation, rather than providing a single indication for a particular target, and would tend to confuse the amplitude information available to the observer for return singals. Therefore, suitable processing apparatus must be provided to interpret the vidicon output from such a system or produce a single output for each of the frequency channels which include several phase channels. Also, the background output from the vidicon should be eliminated to provide a sharper indication.

Accordingly, it is the principal object of the present invention to provide an improved signal processing arrangement for a light line optical correlator. Another object is to provide a phase-insensitive signal analyzing system which is adapted to reduce a complex electrical signal into its component frequency and time elements. A further object is to provide apparatus for recombining a signal which has been resolved into several phase components occurring at spaced time intervals.

In accordance with this invention, the complex input signal which is to be examined is first mixed with a locally-provided spectrum of frequencies which are related to the frequencies of interest in the incoming signal. Each frequency in the spectrum includes at least two phases, preferably quadrature-related. Correlation between the frequencies of the input and those of the locally-provided spectrum is detected for each of the phases, and the correlation signals are processed in a manner such that a single output signal is provided for each frequency, this output signal being unrelated to the phase relationship. The output signals may then be registered or displayed in terms of frequency and, if necessary, time.

In an illustrative embodiment of this invention, the mixing and correlation-detection operations are provided by a light line optical correlator which utilizes a light chopper having a plurality of frequency channels, one for each signal frequency of interest. Each frequency channel is divided into a group of two or more phase channels which provide the same interruption rate but which are displaced in phase from one another by a substantial phase angle, such as 90°. In addition, the light chopper may include a reference channel which transmits about 50% of the incident light in order to provide a background reference level. This chopper is interposed between a light source and an integrating camera tube such as a vidicon. Processing apparatus is provided to compare the vidicon output corresponding to the frequency channels with the output corresponding to the background level and for producing a single output for each group of phase channels by a sum of squares technique.

The novel features believed characteristic of this invention are set forth with particularity in the appended claims. This invention itself, however, as well as additional objects and advantages thereof, will best be understood from the following detailed description of illustrative embodiments, when read in conjunction with the accompanying drawings, in which:

FIGURE 1 is a schematic representation of a light line optical correlator incorporating the principal features of this invention;

FIGURES *2a–2g* are graphic representations of light- and voltage-vs.-time relationships appearing at various points in the system of FIGURE 1;

FIGURE 3 is a block diagram of the vidicon signal processor of FIGURE 1;

FIGURES *4a–4i* are graphic representations of voltage-vs.-time relationships appearing at various points in the circuit of FIGURE 3;

Figures 1, 2:
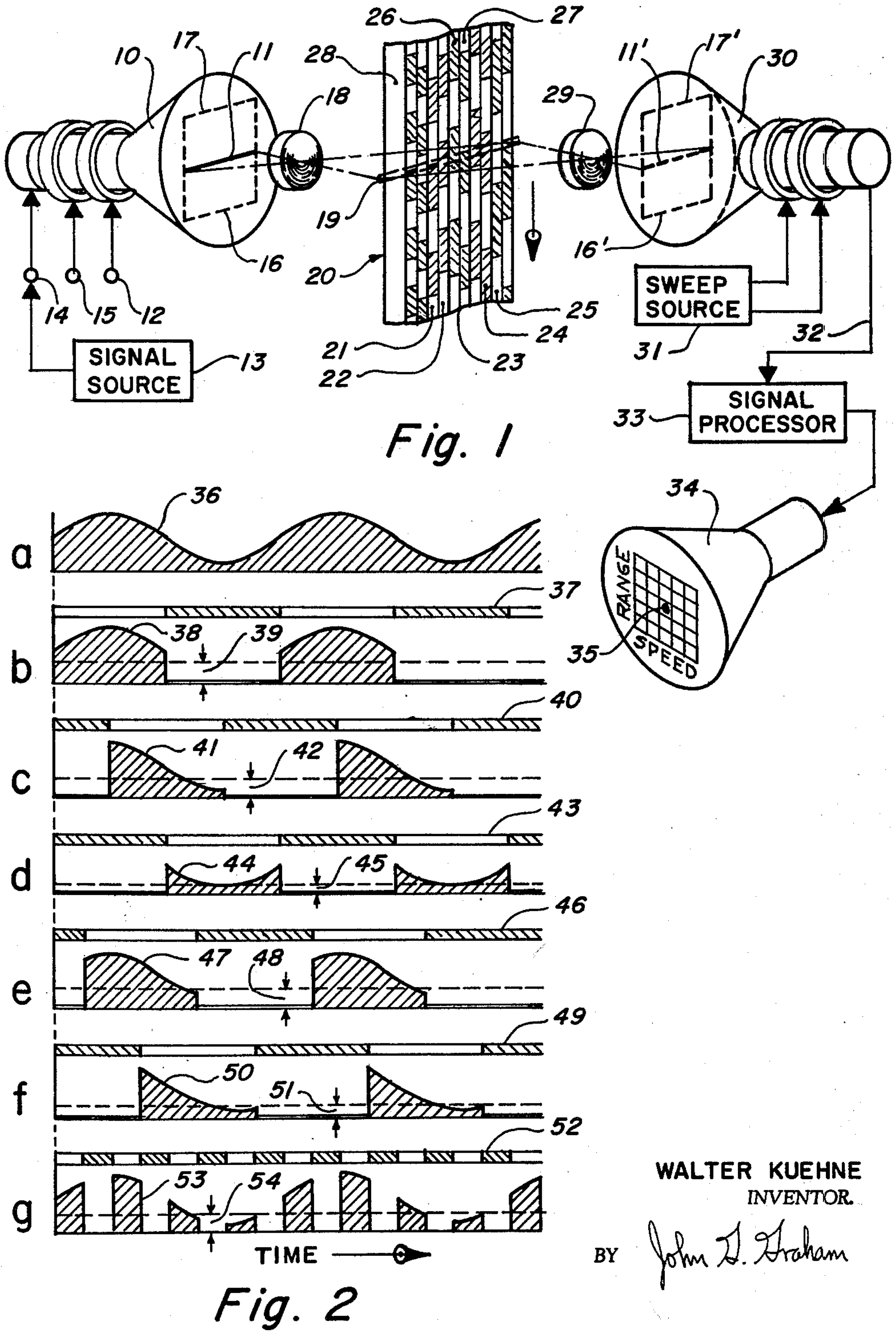
Figure 3:
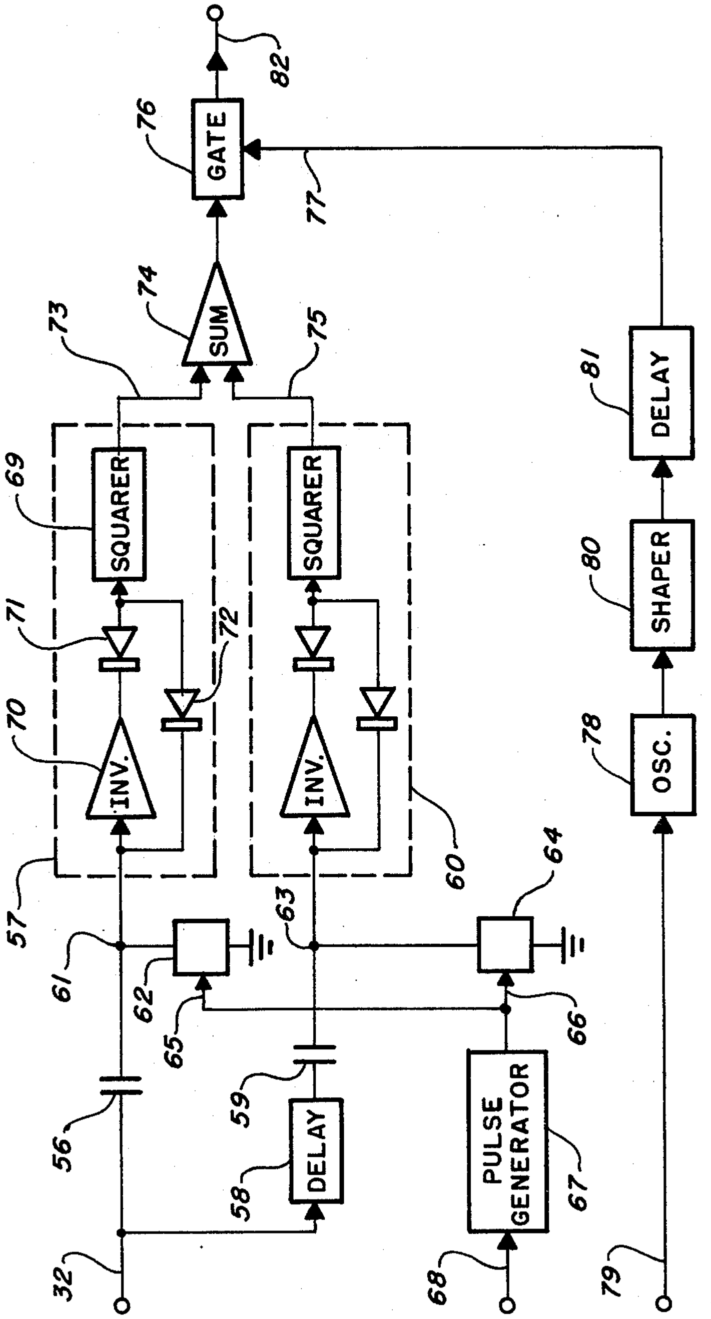
Figures 5, 6, 7:
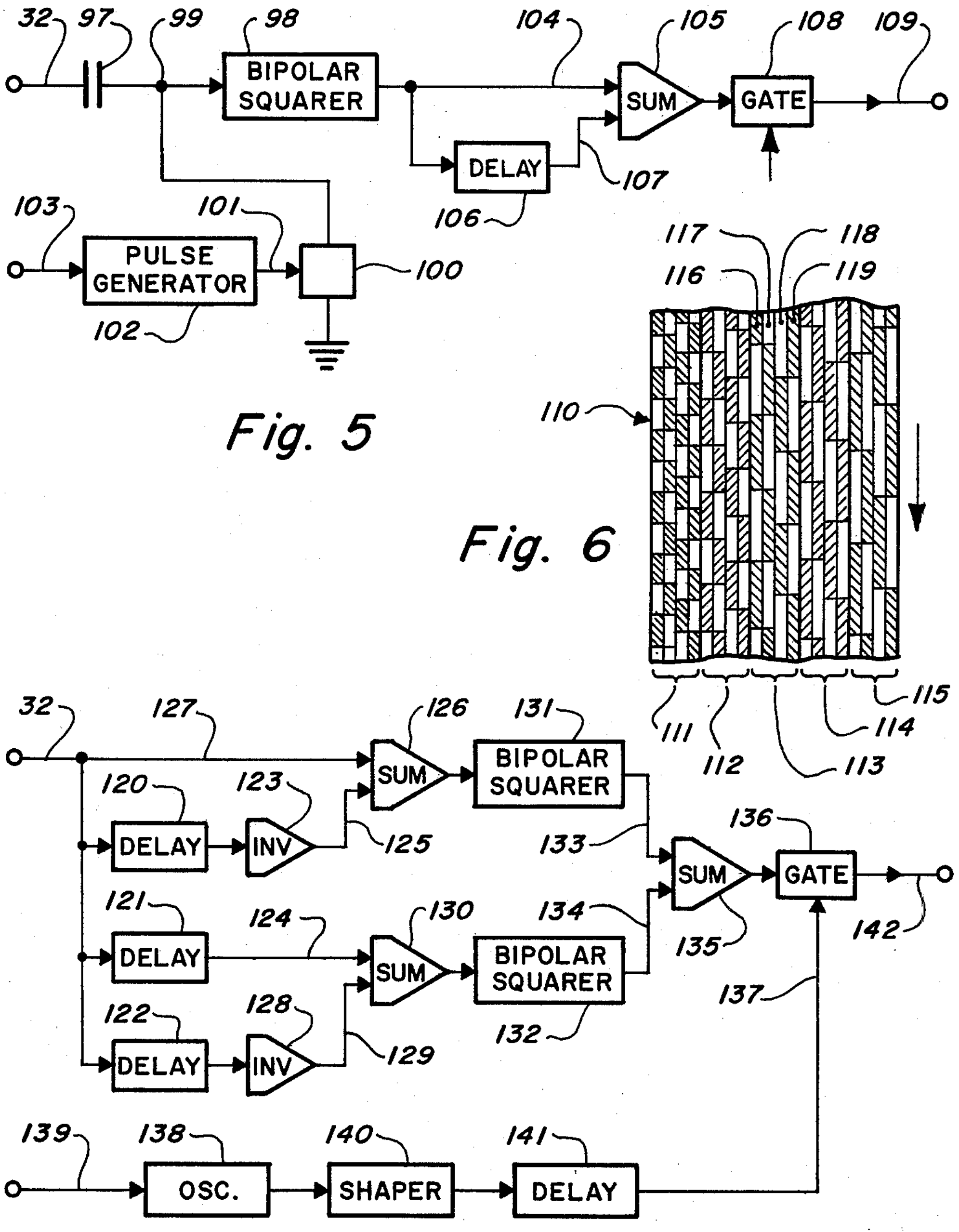
FIGURE 5 is a block diagram of an alternative embodiment of the vidicon signal processor of FIGURE 1.
FIGURE 6 is a front view of an alternative embodiment of a light chopper adapted for use with the system of FIGURE 1 and including four phase channels in each frequency channel.
FIGURE 7 is a block diagram of a vidicon signal processor adapted for use with the system of FIGURE 1 when the light chopper of FIGURE 6 is employed.
Figure 11:
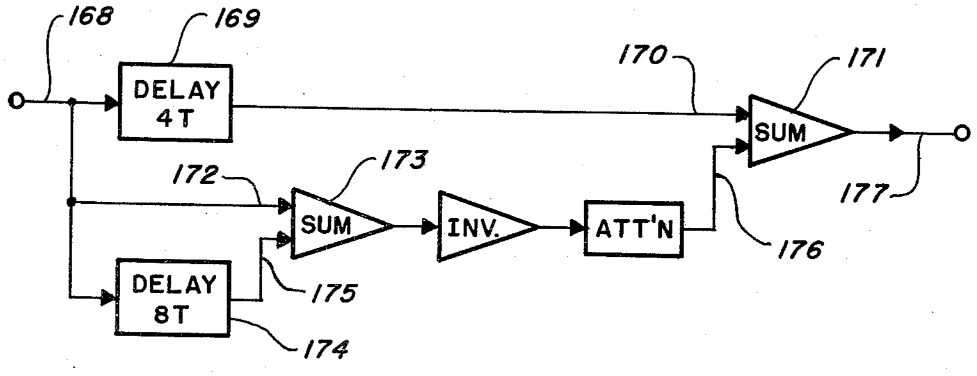
Figures 12, 13, 14:
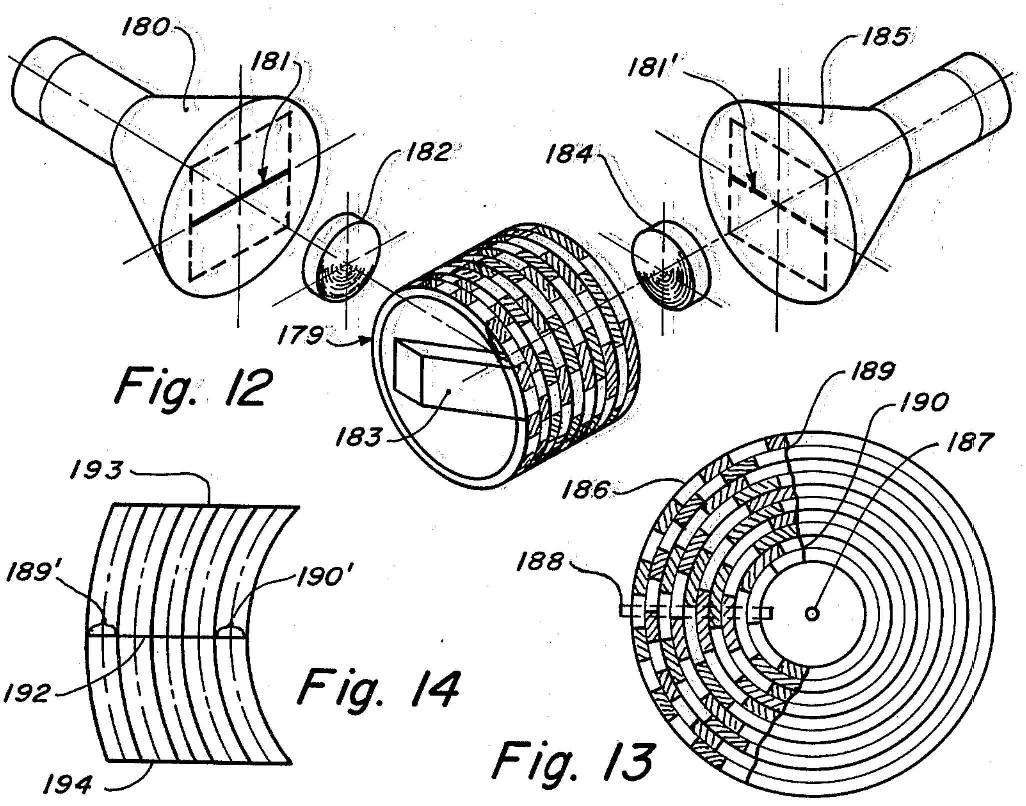
Figure 15:
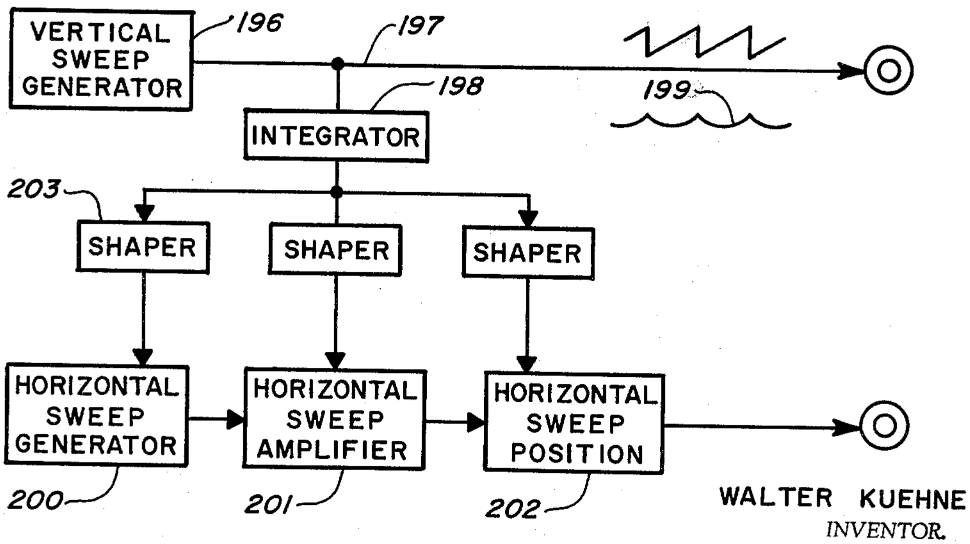

FIGURES *10a–10e* are graphic representations of voltage-vs.-time relationships at various points in the systems of FIGURES 3 and 7;

FIGURE 11 is a block diagram of a compensating arrangement for use in the systems of FIGURES 3 and 7;

FIGURE 12 is a pictorial view of an alternative embodiment of the system of FIGURE 1 employing a rotating drum as a chopping device;

FIGURE 13 is a front view of an alternative embodiment of the light chopper used in the system of FIGURE 1;

FIGURE 14 is a front view of the image on the vidicon screen of FIGURE 1 when the disc-type chopper of FIGURE 13 is used; and FIGURE 15 is a block diagram of the vidicon sweep generator used in the system of FIGURE 1 when the chopper of FIGURE 13 is employed.

With reference to FIGURE 1, the invention is shown embodied in an optical correlator wherein a cathode ray tube 10 is utilized to generate a light line 11 by a method such as driving a horizontal input 12 with a high frequency sawtooth voltage. As set forth in the above-mentioned copending application, the light line 11 is intensity modulated by driving the intensity grid of the cathode ray tube 10 with the complex signal which is to be analyzed. That is, a signal source 13, such as the phase-detected output of the receiver of a pulsed Doppler radar system, may be connected to an intensity input 14. The light line 11 may be vertically deflected to correspond to time or range by driving a vertical input 15 with a sawtooth waveform which is synchronized with the radar transmitter output pulses. The light line 11 is thus swept from a position 16 at the bottom of the tube face to a position 17 at the top, this sweep being at a frequency equal to the pulse repetition rate of the radar transmitter. During this vertical sweep the entire line 11 varies in light intensity according to the phase-detected radar return signals.

The light line 11 is imaged by a lens 18 onto an elongated area 19 of a light chopper 20. Although the chopper may take various forms such as a rotating disc or drum, the light chopper 20 is shown for simplicity in the form of a continuous belt of film which is moved at a constant speed in the direction indicated by an arrow. The chopper 20 is provided with a pattern of alternately opaque and transparent areas which define a plurality of separate frequency channels, each of which corresponds to a particular Doppler frequency. The number of channels used would depend upon the number of particular frequencies of interest and may be a very large number, although a set of only five channels 21–25 are shown for illustrative purposes. Each frequency channel is divided into two adjacent phase channels which are shifted in phase with respect to one another by 90° or one fourth of a chopping cycle at the particular chopping frequency. Considering the channel 23 for example, it is seen that a pair of phase channels 26 and 27 are provided which have the same number of alternate clear and opaque areas per unit length, and that the clear areas are equal in length to the opaque areas. The phase channels 26 and 27 are shifted in phase by 90°, however, since each of the opaque areas of the phase channel 27 starts at the mid-point of an adjacent opaque area of the channel 26. Although the light chopper 20 is described as employing alternate clear and opaque areas to define the chopping channels, it should be noted that the channels may be defined by any type of periodically varying light transmissivity pattern. That is, rather than square wave interruption as shown, it may be preferable to utilize sinusoidally varying light transmission for the chopping channels.

The light chopper 20 further includes a reference channel 28 which is adapted to transmit about half of the incident light. This channel 28 is utilized to provide a reference light level equal to the average light transmitted through the channels 21–25 for noncorrelating signals. This channel may be provided by chopping at a frequency much higher than the signal frequencies of interest, or by a channel having 50% transmissivity.

The light passing through the chopper 20 in the area 19 is imaged by a lens 29 onto the screen of a light integrating camera tube such as a vidicon 30. A light line 11' thus appears on the vidicon 30 which corresponds to the intensity-modulated light line 11, but which has been further modulated by the light chopper 20. This line 11' will sweep vertically from a position 16' to a position 17' along with the line 11. The screen of the vidicon 30 may be considered to be divided into a large number of discrete integrating areas, each of which has a horizontal dimension corresponding to the width of a phase channel on the chopper 20 and a vertical dimension depending upon the vidicon scanning beam diameter, the width of the line 11', and upon the necessary range resolution. According to the conventional operating principles of vidicon tubes, the screen may be considered to define a large number of separate capacitors which are charged by the scanning beam. Incident light will tend to discharge these capacitors, and so the beam current required to recharge the capacitance of a given area will be an indication of the integral of the light impinging upon this area since the preceding scan. The vidicon 30 is read out in a conventional manner by generating suitable beam scanning signals by a horizontal and vertical sweep generator 31. The scan rate may be the usual television-type raster, which is 30 frames per second and 525 lines per frame, so that standard monitor apparatus may be used for display.

The vidicon output signal, which is derived from the scanning beam current, is applied by a line 32 to a signal processor 33. The processor 33, described in detail below, is adapted to generate a single output from the signals derived from the two phase channels in each frequency channel and also to cancel the ambient signal by means of the output from the reference channel 28. The corrected signal output from the processor 33 is applied to the video input of a suitable display tube 34 which may be a conventional television monitor. The screen of the monitor tube 34 may be marked with a suitable range vs. speed scale such that speed is indicated as horizontal position and range as vertical position. The number of speed divisions will be the same as the number of frequency channels in the light chopper 20, while the number of range divisions is arbitrary, being limited by the range resolution of the radar system, the width of the light line 11, the vidicon scan beam diameter, and various other factors. Moving targets will appear as spots on the tube 34. A target having a closing velocity or Doppler frequency corresponding to the interruption rate of the channel 23 and a range of about one-half full scale, for example, will appear as a spot 35. Of course, many targets could be detected and displayed simultaneously.

The operation of the apparatus thus far described may best be understood by reference to FIGURE 2, with the assumption that a signal having a voltage-vs.-time relationship as represented by a waveform 36 of FIGURE 2*a* is applied to the input 14. Initially, it will also be assumed for simplicity that the light line 11 is not being swept in the vertical direction. The light line 11 will vary in intensity according to an intensity-vs.-time relationship as illustrated by the waveform 36. If the modulation frequency of the waveform 36 correlates with the interruption rate of the channel 23 of the chopper 20, for example, and the phase relationship of the phase channel 26 is such that the transparent areas occur during the light peaks as illustrated by a strip 37 in FIGURE 2*b*, then the light passing through the phase channel 26 may be represented by a waveform 38. This light waveform 38, striking the appropriate integrating area of the vidicon 30, will result in an average light level or voltage level 39, when integrated over many cycles. The phase channel 27, being displaced by 90°, may be represented by a strip 40 in FIGURE 2*c* and will produce a light waveform 41 and an average level 42. The level 42 will be the same as that produced by noncorrelating chopper channels, and will not provide a recognizable signal. If the phase channel 26 is in the phase position represented by the strip 40 in FIGURE 2*c*, on the other hand, then the phase channel 27 will be in a phase position represented by a strip 43 in FIGURE 2*d*, and a light waveform 44 will be produced in the integrating area of the vidicon screen corresponding to the phase channel 27. This will result in an average level 45, which is below the background or noncorrelating level and the 90° phase level 42. If the phase channel 26 is chopping the light waveform 36 at a 45° phase position as illustrated by a strip 46 in FIGURE 2e, then a light waveform 47 will reach the corresponding integrating area and will produce an average level 48, while the phase channel 27 will be at a 135° phase position represented by a strip 49 in FIGURE 2f and will produce a light waveform 50 and a level 51. It is seen that both of the levels 48 and 51 are different from the noncorrelating or 90° level 42, so that in the 45° position both phase channels produce recognizable outputs. If the interruption rate of the chopping channel is much greater than the frequency of the waveform 36, as seen by a strip 52 in FIGURE 2g, then a light intensity function 53 will reach the appropriate area of the vidicon, resulting in an integrated or average level 54. This is the noncorrelating level, equal to the 90° level 42, and would be the same whether the interruption rate was more or less than the input. The channel 28 also produces a level 54 or 42 on the vidicon, and may do so by having a high frequency chopping pattern scribed thereon.

The operation of the system of FIGURE 1 may be explained on the same basis if a pulsed signal is applied to the input 14 rather than a continuous wave. That is, if the waveform 36 of FIGURE 2a is assumed to be sampled at a rate much greater than the modulation frequency, then the interpretation of FIGURES 2b–2f still applies. Also, if the light line 11 is being swept in a vertical direction at the sampling rate, as would be the case if the correlator system is used with a pulsed Doppler radar, the above explanation is applicable since the light would be in the same vertical position upon the occurrence of each sampling pulse.

With reference to FIGURE 3, one embodiment of the vidicon output signal processor 33 is shown in detail in block diagram form. The vidicon output signal is applied by the line 32 to a capacitor 56 in a first processing channel which includes a bipolar squaring circuit 57. The same vidicon signal is applied to a second processing channel which includes a delay circuit 58 adapted to delay the signal by a time equal to the period required by the vidicon scanning beam to sweep a segment of the screen corresponding to the width of one phase channel. The output of the delay circuit 58 is coupled by a capacitor 59 to the input of another bipolar squaring circuit 60. A terminal 61 between the capacitor 56 and the squaring circuit 57 is connected to a keyed clamping device 62, while a terminal 63 between the capacitor 59 and the squaring circuit 60 is likewise connected to another keyed clamping device 64. The clamping devices 62 and 64 are adapted to short the terminals 61 and 63 to ground when a keying voltage is applied to input terminals 65 and 66, respectively. A pulse generator 67 such as a one-shot multivibrator is provided having an output connected to the clamping device input terminals 65 and 66 and having an input line 68 connected to the sweep generator 31. The pulse generator is adapted to produce a pulse at the beginning of each horizontal sweep of the vidicon 30 having a width somewhat less than the time interval during which the vidicon output signal represents the reference channel 28. For example, in order for the keying pulse not to overlap in time the output of any of the frequency channels, the width of the keying pulse should be equal to the width in scan time of one phase channel. Such a keying pulse applied to the inputs 65 and 66 is effective to short the clamping devices 62 and 64 and allow the capacitors 56 and 59 to charge up to whatever voltage appears on the line 32 at the time.

The bipolar squaring circuit 57 is adapted to square the voltage appearing at the terminal 61 regardless of its polarity, and comprises a conventional squarer 69 having two input channels, one input including an inverter 70 and a series diode 71 while the other input channel includes only a diode 72. The output of the circuit 57 is applied to one input 73 of a summing amplifier 74 while the output of the squaring circuit 60 is applied to a second input 75 of this summing amplifier. The circuit 60 is of course similar to the circuit 57. Since the delay circuit 58 will cause the signals to overlap, it is necessary to sample the composite signal only once during the time the scan traverses one frequency channel, and so the output of the summing amplifier 74 is applied to a sampling gate 76. The gate is operated by a series of pulses applied to another input 77. This series of pulses will be equal in number to the set of frequency channels provided by the chopper 20, and may be produced by an oscillator 78 which is driven into an oscillating condition by a horizontal synch pulse applied to an input 79 from the sweep source 31. The sinusoidal oscillator output, having a frequency equal to the rate at which the vidicon scan intercepts the integrating areas corresponding to the chopper frequency channels, is applied to a shaper 80 to form narrow positive pulse for each oscillator cycle and then to a delay line 81 which insures that the first gate pulse occurs while the scan dwells on the area corresponding to the second phase channel of the first frequency channel. The output of the sampling gate 76 is applied by a line 82 to the video input of the display monitor 34.

Figure 4:
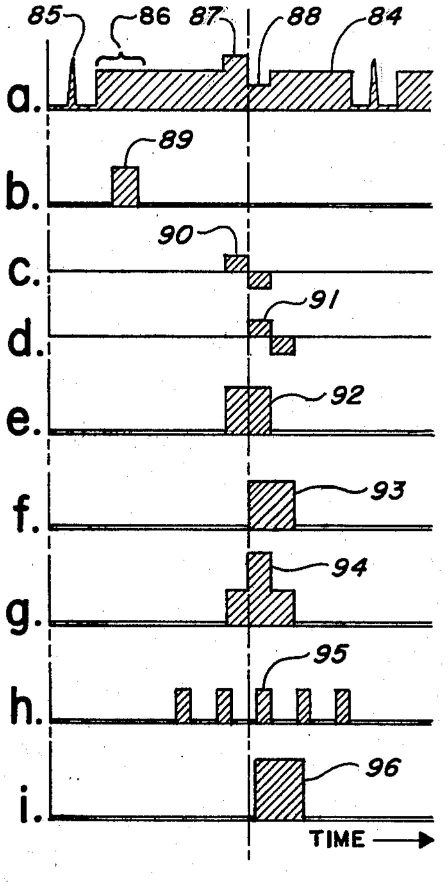

The operation of a signal processing circuit 33 of FIGURE 3 in the system of FIGURE 1 may best be understood by reference to the voltage waveforms illustrated in FIGURE 4. Assuming that a signal is present at the input 14 which correlates with the chopping frequency of the channel 23 and is in a 45° phase position as represented by FIGURES 2e and 2f, then the vidicon output at the line 32 for one horizontal scan at the correct range or vertical position is illustrated by a waveform 84 of FIGURE 4a. A horizontal synch pulse 85 which precedes each scan will be followed by a voltage level 86 corresponding to the reference channel 28 or the level 54 of FIGURE 2g. The noncorrelating channels 21 and 22 will produce about the same average output, but when the scan reaches the integrating areas corresponding to the phase channels 26 and 27 of the channel 23, a positive-going pulse 87 is produced, representing the level 48 of FIGURE 2e, followed by a negative-going pulse 88, representing the level 51 of FIGURE 2f. The remainder of the scan will represent the noncorrelating channels 24 and 25. This waveform 84 is applied to the capacitor 56 and, after a delay corresponding to the width of a phase channel, to the capacitor 59. The clamping circuits 62 and 64 are keyed by a pulse 89 as seen in FIGURE 4b which is generated by the pulse generator 67 and applied to the inputs 65 and 66. The capacitors 56 and 59 thus charge to the background or reference level 86, and retain this charge during this particular horizontal scan. The voltages at the terminals 61 and 63 will therefore vary about zero rather than about the background level, and appear as a pair of waveforms 90 and 91 in FIGURES 4c and 4d, respectively, the latter being delayed by one phase channel width. The outputs of the squaring circuits 57 and 60 will appear on the inputs 73 and 75 as represented by a pair of waveforms 92 and 93 in FIGURES 4e and 4f, respectively, and the output of the summing amplifier 74 will appear as a waveform 94 of FIGURE 4g.

The gating pulses, appearing at the input 77 to the gate 76, will occur in time sequence as seen in FIGURE 4h, a pulse 95 coinciding in time with the highest amplitude portion of the waveform 94. The gate 76 includes a pulse stretching or "box car" arrangement, so that a pulse 96, as seen in FIGURE 4i, will appear on the line 82 or the input to the display tube 34. This pulse 96 has an amplitude corresponding to the highest portion of the waveform 94, a leading edge coinciding with the leading edge of the pulse 95, and a pulse width corresponding to the width of one frequency channel. It is thus seen that a signal correlating with the chopping frequency of the channel 23 will produce a distinct unidirectional video input pulse to the visual display tube 34 and so will produce a bright, clear indication on the tube face, regardless of the phase relationship of the input signal and the chopping channel.

An alternative embodiment of the signal processor 33 adapted for use with a chopper having two phase channels per frequency channel is seen in FIGURE 5. This arrangement produces the same type of output as the circuit of FIGURE 3 except that only one keyed clamping device and one bipolar squaring circuit are needed. The vidicon output on the line 32 is coupled by a capacitor 97 to the input of a bipolar squaring circuit 98, which is similar to the circuit 57 described above. A junction 99 between the capacitor 97 and the squarer 98 is coupled to ground by a keyed clamping device 100. An input 101 of the device 100 is driven from a pulse generator 102 which is effective to short the device 100 and charge the capacitor 97 to the reference level at the beginning of each horizontal sweep, horizontal synch signals being applied to the pulse generator 102 at an input 103 from the sweep source 31. The output of the squarer 98 is applied directly to one input 104 of a summing amplifier 105 and also through a delay line 106 to a second input 107. For a signal correlating with the channel 23, the voltages appearing on the inputs 104 and 107 will appear as seen in FIGURES 4*e* and 4*f*, respectively. The output of the summing amplifier 105 is applied to a gate 108 which corresponds to the gate 76 of FIGURE 3, the remainder of the circuit being the same as above. The circuit of FIGURE 5 is adapted to produce a video output at a line 109 as seen in FIGURE 4*i*.

With the chopping arrangement thus far described, it is possible that a signal may be in about the 180° phase position so that the most pronounced indicia on the vidicon screen will be below the ambient level. While this produces a reciprocal signal on the display, a more favorable signal-to-noise ratio may be obtained if the transparent areas of at least one of the phase channels occur during the light peaks of the signal. Accordingly, it may be desirable in some applications to utilize a chopper 110 as seen in FIGURE 6, which includes four phase channels for each frequency channel, each phase channel being displaced by 90° from the other phase channels in a given frequency channel. The chopper 110 of FIGURE 6 is seen to be a continuous belt of transparent film having a pattern of opaque areas thereon to define a set of only five frequency channels 111–115, although any satisfactory number of frequency channels could be used. The chopper 110 would replace the chopper 20 in the system of FIGURE 1 and would be moving continually at a constant speed in a direction indicated by the arrow. The channel 113, for example, includes four phase channels 116–119. If the phase channel 116 is assumed to be in the 0° position, then the phase channel 117 is in the 180° position, the opaque areas coinciding with the transparent areas of the channel 116. The channel 118 will then be in the 90° position and the phase channel 119 in the 270° phase position. Each of the remaining frequency channels 111, 112, 114, or 115, corresponds to another different signal frequency of interest and includes four phase channels spaced at 0°, 180°, 90°, and 270° positions.

A signal processor adapted for use with the system of FIGURE 1, when the chopper 110 of FIGURE 6 is employed, is illustrated in block diagram form in FIGURE 7. The video output of the vidicon 30 is applied by the line 32 to a set of three delay circuits 120, 121, and 122 which delay the vidicon output signals by time intervals corresponding to scanning periods of one, two and three phase channel widths, respectively. The output of the delay circuit 120 is applied through an inverter circuit 123 to an input 125 of a summing amplifier 126. The signal appearing on the line 32 is also applied directly to another input 127 of the summing amplifier 126. The output of the delay circuit 122 is applied through an inverter 128 to an input 129 of another summing amplifier 130, while the output of the delay circuit 121 is applied directly to another input 124 of the summer 130. The outputs of the summing amplifiers 126 and 130 are applied to inputs of a pair of bipolar squaring circuits 131 and 132, respectively, which are similar to the bipolar squaring circuits 57 described above. The outputs of the circuits 131 and 132 are applied to a pair of inputs 133 and 134, respectively, of a summing amplifier 135. The output of the summing amplifier 135 is applied to one input of a gating circuit 136. The gating circuit 136 is effective to sample the composite signals only once during the time that the scan traverses one frequency channel, and so this gating circuit is operated by a series of pulses applied to another input 137. This series of pulses will be equal in number to the set of frequency channels provided by the chopper 110, and may be produced by an oscillator 138 which is driven into an oscillating condition by horizontal synch pulses applied to an input 139 from the sweep source 31. The sinusoidal oscillator output, having a frequency equal to the rate at which the vidicon scan intercepts the integrating areas corresponding to the chopper frequency channels, is applied to a shaper 140 to form a narrow positive pulse for each oscillator cycle and then is applied to a delay line 141 which insures that the first gate pulse occurs while the scan dwells upon the area corresponding to the fourth phase channel of the first frequency channel 111. The output of the delay circuit 141 is of course applied to the input 137. The output of the sampling gate 136 is applied by a line 142 to the video input of the display monitor 34.

The operation of the processing arrangement illustrated in FIGURE 7 may best be understood by examining a signal produced by one horizontal sweep of the vidicon as it proceeds through the processing circuit. If a signal is present which correlates with the channel 113 for example, and is in a phase position of about 30°, then the vidicon output for one horizontal sweep will appear as a waveform 145, seen in FIGURE 8*a*. The noncorrelating channels 111 and 112 will produce an output of some average level, then when the scan reaches the integrating area corresponding to the phase channel 116 the output will appear as a positive-going pulse 146. The channel 117, being at a 180° phase position, will result in a negative-going pulse 147, followed by positive- and negative-going pulses 148 and 149 corresponding to the channels 118 and 119 which are at 90° and 270° positions. The waveform 145 will appear at the input 127 to the summing device 126. The input appearing on the line 125, having been delayed by a time corresponding to the width of one phase channel and inverted, will appear as a waveform 150 as seen in FIGURE 8*b*. It is seen that the output corresponding to the phase channel 118, represented by a pulse 151, has been brought into time coincidence with the output corresponding to the phase channel 119 or the pulse 149. At the input 124 of the summer 130, a waveform 152 as seen in FIGURE 8*c* will appear, having been delayed by the width of two phase channels so that the output corresponding to the channel 117 represented by a pulse 153 coincides in time with the pulses 149 and 151. At the other input 129 of the summer 130, a waveform 154 as seen in FIGURE 8*d* appears at a position delayed by a width of three phase channels so that the output corresponding to the channel 116, being a pulse 155, coincides in time with the outputs of the remaining phase channels 119, 118, and 117 or the pulses 149, 151 and 153. The output of the summer 126 will be a waveform 156 as seen in FIGURE 8*e*, and when squared by the circuit 131 will appear at the input 133 of the summer 135 as a waveform 157 as seen in FIGURE 8*f*, a level 158 representing the square of the sum of the vidicon output voltages corresponding to the channels 118 and 119. The output of the summer 130 will be a waveform 159 as seen in FIGURE 8*g*, while the output of the squarer 132 will appear at the input 134 of the summer 135 as a waveform 160, as seen in FIGURE 8*h*. A portion 161 of the waveform 160 represents the square of the sum of the outputs from the vidicon corresponding to the channels 116 and 117. The output of the summer 135 will be the algebraic sum of the waveforms 157 and 160. The pulses applied to the input 137 of the gate 136 will be spaced as seen in FIGURE 8*i*, a pulse 162 occurring during the interval when the pulses 149, 151, 153, and 155 are present, representing coincidence between the four phase channels. The output applied to the line 142 will therefore have an amplitude related to the sum of the levels 158 and 161, and, due to the pulse stretching or "box car" arrangement, will have a width corresponding to the time interval representing one frequency channel or four phase channels, appearing as a pulse 163 of FIGURE 8*j*.

Figure 8:
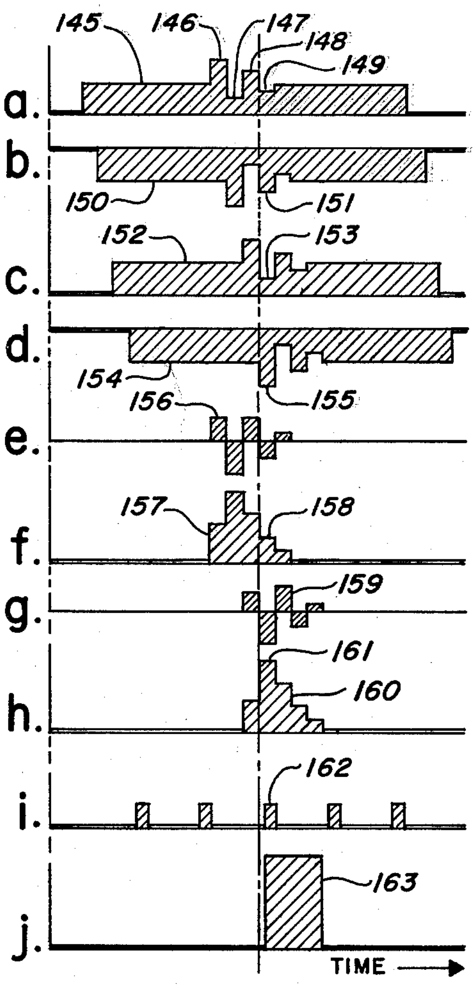
FIGURE 8 is a graphic representation of voltage-vs.-time relationships appearing at various points in the circuit of FIGURE 7.
Figure 9:
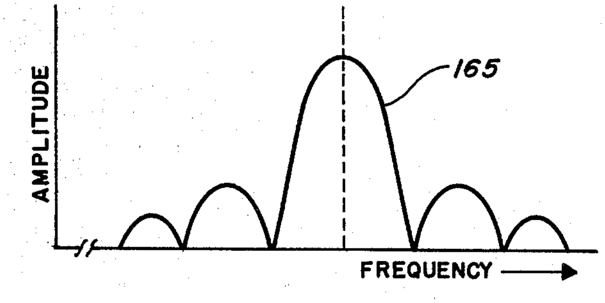
FIGURE 9 is a graphic representation of the amplitude-vs.-frequency relationship of an apparent filter network formed by one of the chopping channels and vidicon integrator areas of the system of FIGURE 1.
Figure 10:
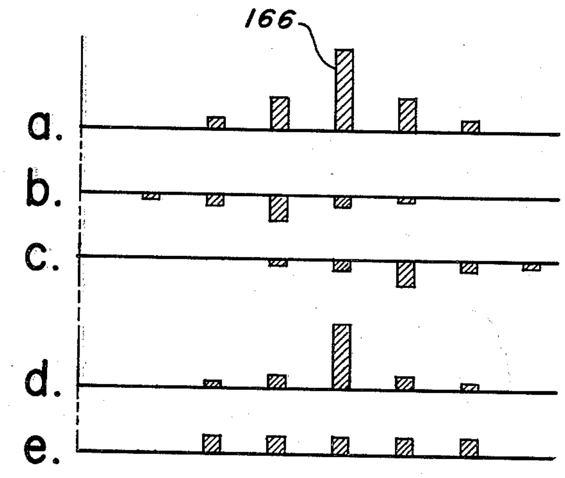

In the discussion of FIGURE 8, it is assumed that the chopping frequencies of the channels 11–15 are separated by a sufficient amount so that there is no response whatsoever by adjacent noncorrelating channels to a signal which correlates with a particular channel. However, the response of each integrating area of the vidicon, along with its corresponding frequency channel, will define a bandpass filter having a $[\sin X/X]^2$ response curve as seen in FIGURE 9. If the channel 113, for example, has a frequency response as seen by a graph 165 of FIGURE 9, and the remaining channels 111, 112, 114, and 115 have similar frequency responses which fall within the spread of the first side lobes of the curve 165, then a signal correlating with channel 113 will not produce merely a single pulse 163, as seen in FIGURE 8*j*, but instead will produce responses from each channel. Considering only the portions of the output of the summing amplifier 135 which coincide in time with the sampling pulses applied to the input 137 of the gate 136, the response of the system may produce an output as seen in FIGURE 10*a*, wherein the channel 113, for example, will produce a large amplitude pulse 166. The channels 111, 112, 114 and 115 would also produce lower amplitude outputs which are, of course, undesirable. These spurious outputs may be substantially eliminated by adding the attenuated inverse of the signal seen in FIGURE 10*a* at positions leading and lagging in time by an interval equal to the scan time of one frequency channel, as seen in FIGURES 10*b* and 10*c*. Addition of the signals appearing in FIGURES 10*a*, 10*b*, and 10*c* results in a composite output as seen in FIGURE 10*d*. This result may be accomplished by a circuit as seen in block diagram form in FIGURE 11. This circuit would be interposed between the summing amplifier 135 and the gate 136 of FIGURE 7, or else between the gate 136 and the output line 142. The output of the summer 135 is applied by a line 168 to a delay device 169, which provides a delay equal to the width of four phase channels or one frequency channel. The output of the delay line 169 is applied to an input 170 of a summing amplifier 171. The output from the summer 135 is also applied to an input 172 of a summing amplifier 173 with no delay circuit interposed. The signal appearing on the line 168 is also applied through a delay line 174 to another input 175 of this summer 173. The delay line 174 introduces a delay equal to the width of two frequency channels or eight phase channels. The output of the summer 173 is inverted and attenuated, and then applied to a second input 176 to the summer 171. The signal appearing on the input 176 is a composite of the signals represented by FIGURES 10*b* and 10*c*, while the signal appearing on the input 170 corresponds to the series of pulses seen in FIGURE 10*a*. The output of the summer 171, appearing on a line 177, is applied to the input of the gate 136 or to the output line 142 of FIGURE 7 and may be represented by the waveform of FIGURE 10*d*, wherein it is seen that the spurious responses due to adjacent frequency channels has been greatly reduced or almost eliminated. If the circuit of FIGURE 11 is inserted prior to the gate 136 of FIGURE 7, then to account for the delay of one frequency channel, the sampling pulses applied to the gate 136 would have to be delayed also, as seen in FIGURE 10*e*.

Instead of utilizing a continuous belt chopper 20 as illustrated in FIGURE 1, a rotating drum 179 may be employed as shown in FIGURE 12. As in FIGURE 1, the embodiment of FIGURE 12 includes a cathode ray tube 180 for generating an intensity-modulated light line 181 which may be swept vertically according to range. The light line 181 is focused through a lens 182 onto the surface of the rotating drum 179. The drum is transparent except for staggered opaque areas which define five circumferential channels in a manner similar to the chopper 20 of FIGURE 1. Each channel may include two or more phase channels as discussed above, and also a channel of 50% transmissivity may be included to establish a reference level. Light which is not blocked by the opaque areas of the drum 179 reaches a prism or plane mirror 183 positioned within the drum. The mirror 183 directs the light along the axis of the drum and through a lens 184 to a camera tube or vidicon 185, where the light line 181 will appear as a modulated or chopped light line 181'. This line 181' will move vertically in synchronization with the line 181 to expose the mosaic of integrating areas on the vidicon screen, and the vidicon 185 may be read out by conventional television techniques as set forth above. Each integrating area of the vidicon screen along with its corresponding channel of the drum 179 will define a filter having a center frequency determined by the interruption rate of the channel and a bandwidth related to the integrating period or vidicon readout sweep rate.

Alternatively, a rotating disc 186 as illustrated in FIGURE 13 may be employed as the light chopper. The disc 186 would be positioned in a plane perpendicular to the light path in the same place as the chopper 20 in the apparatus of FIGURE 1, and would be rotated at a constant speed about an axis 187 while the light line would be imaged upon an area 188. A plurality of concentric channels of alternate opaque and transparent areas define a set of modulating frequencies as above, each frequency channel having two or four phase channels, an outer channel 189 corresponding to the highest frequency and the inner channel 190 to the lowest frequency. A channel of 50% transmissivity may also be included to establish a reference level.

When using the chopping disc 186 of FIGURE 13 in the system of FIGURE 1, it will be seen that as the light line 11 is swept vertically from the position 16 to the position 17, the area 188 on the disc will also move vertically and will not remain on a diameter of the disc. Thus, the image appearing on the screen of the vidicon 30 will be distorted rather than rectangular, and will be of the form seen in FIGURE 14. When the light line 11 is in the center of the screen, the image of the light line of the vidicon will lie along the line 192 of FIGURE 14, where the segment of the line 192 corresponding to the channel 189 is represented by the image 189' of the channel. This image 189' will be equal in length to the segment of the line 192 corresponding to the image 190' of the channel 190. However, when the light line 11 has moved up to the position 17 on the tube 10, the image of the line will lie along a line 193 of FIGURE 14. The segment of this line 193 representing the channel 189 is proportionally shorter than the segment of the line 193 representing the channel 190. Likewise, when the light line 11 has reached the position 16 or is at its lowest limit of travel, the image of the line on the vidicon screen will be along a line 194 of FIGURE 14, this line being likewise shifted to the right and distorted along its length. To compensate for this distortion the vidicon readout sweep must be predistorted and shifted in position as it moves vertically. This may be accomplished by modulating the horizontal sweep waveform which is applied to the horizontal deflection coil of the vidicon 30. An embodiment of the sweep source 31 of FIGURE 1 adapted to predistort the horizontal sweep of the scanning beam as it moves vertically is shown in block diagram form in FIGURE 15. A vertical sweep generator 196 is provided which is adapted to produce a sawtooth output at a frequency of 30 c.p.s., for example, having a form as illustrated in the drawing. This waveform is applied by a line 197 to the vertical deflection yoke of the tube and also is applied to an integrator 198 which produces a parabolic output as seen by a waveform 199 in the drawing, the period of this waveform being the same as that of the vertical sweep. The sweep circuit also includes a horizontal sweep generator 200 which drives the horizontal deflection yoke through a control-voltage-responsive, variable-gain amplifier 201 and a variable sweep position device 202. The output of the integrator 198 is applied through a suitable shaper 203 to a linearity control input of the sweep generator 200. The sweep generator 200 is effective to alter the horizontal sweep waveform from a linear sawtooth to an exponential type function when the sweep is near the bottom or top of the screen, in response to the waveform 199. When the sweep is in the center of the screen, the generator 200 provides a linear sawtooth sweep. The gain control input of the sweep amplifier 201 is also driven by the output of the integrator 198 through a suitable shaper, and this amplifier is effective to increase the length of the scan at the upper and lower portions of the screen. Likewise, the device 202 is driven from the integrator 198 through a suitable shaper and is effective to add a variable bias to the horizontal sweep waveform, this bias increasing as the sweep departs from the center of the screen and being proportional to the parabolic waveform 199. With the arrangement of FIGURE 15, the vidicon scan will define a raster as seen in FIGURE 14, which will correct the distortions caused by the curvature of the disc. The vidicon output signal will of course appear the same as if a rectangular raster is used, and the display tube will provide the same rectangular output as described above.

While this invention has been described with reference to several illustrative embodiments, this description is not to be construed in a limiting sense. It is of course understood that various modifications may be made by persons skilled in the art on the basis of this specification, and so it is contemplated that the appended claims will cover any such modifications within the true scope of the invention.

What is claimed is:

1. A system for determining the presence of certain frequencies in an input signal comprising means for generating a light line variable in intensity according to said input signal, a line of light-integrating areas exposed to said light line, light-modulating means interposed between said light line and said light-integrating areas, said light-modulating means being adapted to modulate each of a plurality of transversely-spaced segments of said light line, each of said segments being modulated at one of said certain frequencies and at a plurality of different phase relationships, means for sequentially sampling each of said light-integrating areas and deriving output signals therefrom, processing means connected to said sampling means to receive said output signals and adapted to produce a composite output for each of said segments, said composite signal having an amplitude independent of the phase of said input signal, and means for displaying said composite signals in sequence.

2. In apparatus for determining the presence of certain frequencies in a signal:

(*a*) a light source adapted to produce a light line which is modulated in intensity according to said signal, said light line being swept in a direction normal to its length at a rate corresponding to a basic period of said signal, (*b*) a mosaic of light-integrating areas exposed to said light line, (*c*) a light-interrupting surface interposed between said light source and said mosaic, said light-interrupting surface moving at a predetermined speed in a direction normal to said light line, (*d*) a plurality of adjacent interrupting channels defined by said interrupting surface, each of said channels being effective to interrupt one of a plurality of transversely-spaced portions of said light line at one of a plurality of different frequencies corresponding to said certain frequencies and at a plurality of quadrature-related phases, (*e*) means for sampling each of said light-integrating areas in sequence and deriving output signals therefrom, (*f*) combining means connected to receive said output signals and adapted to produce a combined output for each of said channels including a function of the sum of the squares of the output signals from each of the quadrature-related phases, (*g*) and means for registering said combined outputs in an array of frequency versus time.

3. Apparatus according to claim 2 wherein said light-interrupting surface is a cylinder rotating about its axis and said channels are defined on the surface of said cylinder.

4. Apparatus according to claim 2 wherein said light-interrupting surface is a disc rotating about its axis and said channels are defined in a concentric relation on the surface of said disc.

5. Apparatus according to claim 2 wherein said means for sampling is adapted to scan said mosaic of light-integrating areas in a pattern defining a sequence of lines parallel to said light line and spaced in a direction normal to said light line, the time interval of said scan being much longer than said basic period of said signal, and wherein said means for registering is a cathode ray tube having a beam-scanning pattern the same as said means for sampling, the beam of said cathode ray tube being modulated in intensity according to said combined outputs.

6. Apparatus according to claim 2 wherein a compensating circuit including at least two pairs of delay and attenuating networks is interposed between said combining means and said means for registering to attenuate responses in adjacent channels due to a signal in a given channel.

7. In apparatus for determining the presence of certain frequencies in a signal:

(*a*) a light source adapted to produce a light line which is modulated in intensity according to said signal, said light line being swept in a direction normal to its length at a rate corresponding to a basic period of said signal, (*b*) a mosaic of light-integrating areas exposed to said light line, (*c*) a light-interrupting disc interposed between said light source and said mosaic, said disc being rotated about its axis at a predetermined speed, said light line extending along a radius of said disc, (*d*) a plurality of interrupting channels defined in a concentric relation on said disc, each of said channels being effective to interrupt one of a plurality of transversely-spaced portions of said light line at one of a plurality of different frequencies corresponding to said certain frequencies and at a plurality of quadrature-related phases for each of said certain frequencies, (*e*) sampling means adapted to scan said mosaic in an irregular pattern corresponding to the shape of said disc and including a sequence of lines parallel to said light line and spaced normal to said light line, said sampling means providing an output signal for each of said areas, (*f*) combining means connected to receive said output signals and adapted to produce a combined output for each channel during each of said sequence of lines, each of said combined outputs being a function of the sum of the output signals from each of the quadrature-related phases in the corresponding channel, (*g*) and means for registering said combined outputs in an array of frequency versus time.

8. In apparatus for determining the presence of certain frequencies in a signal:

(*a*) a light source adapted to produce a light line which is modulated in intensity according to said signal, said light line being swept in a direction normal to its length at a rate corresponding to a basic period of said signal, (*b*) a mosaic of light-integrating areas exposed to said light line, (*c*) a light-interrupting surface interposed between said light source and said mosaic, said interrupting surface moving at a predetermined speed in a direction normal to said light line, (*d*) a plurality of adjacent interrupting channels defined by said surface, each of said interrupting channels including a pair of phase channels, each of said interrupting channels being effective to interrupt one of a plurality of transversely-spaced segments of said light line at one of a plurality of different frequencies corresponding to said certain frequencies, each of said phase channels in each of said interrupting channels being effective to interrupt a portion of each of said segments at one of a pair of quadrature-related phases for each of said different frequencies, (*e*) means for sampling each of said light-integrating areas in sequence and deriving therefrom an output signal corresponding to each portion of each segment of the interrupted light line, (*f*) squaring means connected to receive said output signals and adapted to produce an output voltage related to the instantaneous square thereof, (*g*) delay means connected to receive said output voltage and adapted to produce a delayed voltage which lags said output voltage by a time interval corresponding to the dwell time of said sampling means upon a light-integrating area representing one of said portions of said segments, (*h*) means connected to receive said output voltage and said delayed voltage and adapted to produce a composite output related to the sum thereof, (*i*) means connected to receive said composite output and adapted to produce an output related in magnitude to the value of said composite output during the time interval in which said sampling means dwells upon the integrating area corresponding to the latter of each pair of portions in each segment, (*j*) and means for registering said output in an array of frequency versus time.

9. In apparatus for determining the presence of certain frequencies in a recurring signal:

(*a*) a light source adapted to produce a light line which is modulated in intensity according to said signal, said light line being swept in a direction normal to its length at a rate corresponding to the basic period of recurrence of said signal, (*b*) a mosaic of light-integrating areas exposed to said light line, (*c*) a light-interrupting surface interposed between said light source and said mosaic, said interrupting surface moving normal to said light line, (*d*) a plurality of adjacent frequency channels defined by said interrupting surface, each of said frequency channels including a pair of phase channels, each of said frequency channels being effective to interrupt one of a plurality of transversely-spaced segments of said light line at one of said certain frequencies, each of said phase channels in each frequency channel being effective to interrupt a portion of each of said segments at one of a pair of quadrature-related phases, (*e*) a reference channel defined by said interrupting surface effective to transmit an amount of light corresponding to the background level impinging upon said integrating areas due to non-correlating signals, (*f*) sampling means adapted to scan said mosaic of light-integrating areas and effective to derive output signals therefrom, said scan being in a pattern defining a sequence of lines parallel to said light line and spaced in a direction normal to said light line, the time required to scan the pattern being much longer than said basic period, the scan including an integrating area representating said reference channel during each of said sequence of lines, (*g*) combining means connected to receive said output signals and adapted to produce a combined output for each of said frequency channels during the scan of each of said sequence of lines including a function of the output signals for each of said pair of phase channels, (*h*) subtracting means included in said combining means and effective to subtract from said output signals a value corresponding to the level of the output signal representing said reference channel for each of said sequence of lines, (*i*) and means for registering said combined outputs in any array of frequency versus time.

References Cited by the Examiner

UNITED STATES PATENTS

| | | | |
|---|---|---|---|
| 2,491,190 | 12/49 | Long | 324—77 |
| 2,743,378 | 4/56 | Covely et al. | 88—1 |
| 2,820,173 | 1/58 | Raabe | 324—77 X |
| 2,886,718 | 5/59 | Shepherd et al. | 250—220 |
| 2,906,916 | 9/59 | Palmer | 88—1 X |
| 2,991,419 | 7/61 | Nilsson | 250—219 X |
| 2,991,467 | 7/61 | Clarke | 343—7 X |

RALPH G. NILSON, *Primary Examiner.*

WALTER STOLWEIN, MAYNARD R. WILBUR, *Examiners.*